(12) United States Patent
Frazier et al.

(10) Patent No.: US 7,818,251 B2
(45) Date of Patent: Oct. 19, 2010

(54) WEB-BASED PAYMENT SYSTEM AND METHOD

(75) Inventors: Patricia A. Frazier, Dallas, TX (US); David T. Shapiro, Highlands Ranch, CO (US)

(73) Assignee: The Western Union Company, Englewood, CO (US)

( * ) Notice: Subject to any disclaimer, the term of this patent is extended or adjusted under 35 U.S.C. 154(b) by 2507 days.

(21) Appl. No.: 10/267,150

(22) Filed: Oct. 8, 2002

(65) Prior Publication Data
US 2003/0110129 A1      Jun. 12, 2003

Related U.S. Application Data

(60) Provisional application No. 60/339,732, filed on Dec. 10, 2001.

(51) Int. Cl.
*G06F 17/60* (2006.01)
(52) U.S. Cl. .............................. 705/40; 704/257; 705/35
(58) Field of Classification Search ............... 705/1–90; 235/375, 377; 707/104, E17.001
See application file for complete search history.

(56) References Cited

U.S. PATENT DOCUMENTS

| | | | |
|---|---|---|---|
| 5,920,847 A * | 7/1999 | Kolling et al. | 705/40 |
| 5,956,700 A | 9/1999 | Landry | |
| 6,556,970 B1 * | 4/2003 | Sasaki et al. | 704/257 |
| 2002/0077978 A1 | 6/2002 | O'Leary et al. | |
| 2002/0082961 A1 * | 6/2002 | Abrahm et al. | 705/35 |
| 2003/0110129 A1 * | 6/2003 | Frazier et al. | 705/40 |

OTHER PUBLICATIONS

Michael Rees, A study on the Cost of Accepting Payments, 2005, eCheck2000, pp. 1-5.*
Western Union/Quick Collect "There Are No Guarantees In Life" brochure, May 2000.
Western Union/Quick Collect "The Fastest Way To Collect Good Funds.$^{SM}$" brochure, Rev. Nov. 1999.

* cited by examiner

*Primary Examiner*—James P Trammell
*Assistant Examiner*—Marissa Liu
(74) *Attorney, Agent, or Firm*—Townsend and Townsend and Crew LLP

(57) ABSTRACT

A payment processing method comprises receiving at a host computer system payment information from a client computer, wherein the payment information relates to a payment from a consumer. The method further comprises verifying at least a portion of the payment information and storing at least a portion of the payment information in a database. The method further comprises transmitting a first electronic file comprising at least a portion of the payment information to a financial institution, thereby initiating processing of the payment and transmitting a second electronic file comprises at least a portion of the payment information to a client computing system. The method also comprises responding to a request for historical information by transmitting to a user computer system a third electronic file comprising at least a portion of the payment information.

24 Claims, 29 Drawing Sheets

WESTERN UNION | WEB PHONE PAY

INITIATE A NEW PAYMENT
Account # : 6800415470

A payment for this customer is unable to be made at this time.

REASON:

There are currently 2 NSF payments on this funding account.

In order to continue with Payment Request, you must have Supervisor authorization.

Approval Login: [ADMIN]
Supervisor Login: [ ]

[Continue with Payment]  [Cancel Request]

700

Login   Select a Company   Payments   Search   Reports   Administration   Help   Logout

*Fig. 7*

WESTERN UNION | WEB PHONE PAY

INITIATE A NEW PAYMENT
Account # : 6800415470

00001

Wayker Matthew G. — 802
123 Main Street
Any Town | US | 00000  — 804

Pay To The Order Of: ABC Electric Corporation — 812

I: 888888888 — 806 : 777777777 — 808  II: — 814

PAYMENT INFORMATION

Acct # 1    6800415470 — 810

Payment Amount  $ 150.00    Date  08/14/2001

Fee   $ 3.00    Waive Fee  | No Waive Fee ▼ | — 812

[ Click to add more payments ] — 814

818 — [ Continue ]  [ Cancel ] — 816    800

Login   Select a Company   Payments   Search   Reports   Administration   Help   Logout

*Fig. 8*

WESTERN UNION | WEB PHONE PAY

INITIATE A NEW PAYMENT
Account # : 6800415470

00001

Wayker Matthew G.

123 Main Street

| Any Town | US | 00000 |

Pay To The Order Of: ABC Electric Corporation

I: 888888888 : 777777777 II: 900

PAYMENT INFORMATION

Acct # 1  6800415470

Payment Amount  $ 150.00     Date  08/14/2001

Fee  $ 3.00     Waive Fee  No Waive Fee ▼

---

Acct # 2

Payment Amount  $     Date  08/14/2001

Fee  $ 3.00     Waive Fee  No Waive Fee ▼

*Fig. 9A*

Acct # 3 [        ]

Payment Amount $ [        ]    Date    08/14/2001

Fee              $ 3.00         Waive Fee   | No Waive Fee ▼ |

---

Acct # 4 [        ]

Payment Amount $ [        ]    Date    08/14/2001

Fee              $ 3.00         Waive Fee   | No Waive Fee ▼ |

---

Acct # 5 [        ]

Payment Amount $ [        ]    Date    08/14/2001

Fee              $ 3.00         Waive Fee   | No Waive Fee ▼ |

*Fig. 9B*

WESTERN UNION | WEB PHONE PAY

INITIATE A NEW PAYMENT
Confirmation
Account # : 6800415470

Date: Tues Aug 14 2001 14:59:32
Name on ABC Electric Account: WAYKER METTHEW G
Address: 123 Main Street
Address:
City/State/Zip: Any Town, US 0000
Total Payment: $ 150.00
Total Fee: $ 3.00
Bank Name: FIRST UNION NATIONAL BANK
Account Type: Checking
Checking Account Number: 8899985896
Routing Number: 031000009

Accounts to be paid today 08/14/2001
Payment 1
Account Number 1:  Amount: $150.00  Fee: $3.00  Total Amount
6800415470                                      $ 153.00

If this information is correct, press "Confirm" to finalize this transaction; otherwise, press "Modify" to make any required changes.

[Confirm] [Modify] [Cancel]
  1004     1006    1008

Login  Select a Company  Payments  Search  Reports  Administration  Help  Logout

*Fig. 10*

WESTERN UNION | WEB PHONE PAY

SCHEDULE A FUTURE PAYMENT
Confirmation
Account # : 6800415470

Payments have been added successfully.

Date: Tues Aug 14 2001 14:59:32
Name on ABC Electric Account: WAYKER MATTHEW G
         Account Number: 6800415470
                 Payment: $153.00
          Payment Date: Thur Aug 30 2001   1102
Transaction Confirmation #: 555666888

Return to Main Menu    1104

1100

Login  Select a Company  Payments  Search  Reports  Administration  Help  Logout

*Fig. 11*

WESTERN UNION | WEB PHONE PAY

SCHEDULE A FUTURE PAYMENT
Account # : 6800415470

00001

Wayker Matthew G.
123 Main Street
Any Town | US | 00000

Pay To The Order Of: ABC Electric Corporation

I: 888888888 : 777777777 II:

PAYMENT INFORMATION

Acct # 1    6800415470

Payment Amount  $ 150.00    Date 08 / 30 / 2001 — 1220

Fee             $ 3.00      Waive Fee  No Waive Fee

Click to add more payments — 1214

Continue    Cancel    1200

Login  Select a Company  Payments  Search  Reports  Administration  Help  Logout

*Fig. 12*

WESTERN UNION | WEB PHONE PAY

SCHEDULE A FUTURE PAYMENT
Account # : 6800415470

| Wayker Matthew G. | | | # 00001 |
|---|---|---|---|
| 123 Main Street | | | |
| Any Town | US | 00000 | |

Pay To The Order Of: ABC Electric Corporation

I: 888888888 : 777777777 II:   1300

PAYMENT INFORMATION

Acct # 1   6800415470
Payment Amount $ 150.00   Date 08 / 30 / 2001
Fee   $ 3.00   Waive Fee   No Waive Fee Acct # 2   6800415470
Payment Amount $ 200.00   Date 09 / 28 / 2001
Fee   $ 3.00   Waive Fee   No Waive Fee

*Fig. 13A*

| Acct # 3 | 6800415470 | | | | | |
|---|---|---|---|---|---|---|
| Payment Amount $ | | Date | Month ▼ | / Date ▼ | / Year ▼ | |
| Fee | $ 3.00 | Waive Fee | No Waive Fee ▼ | | | |

| Acct # 4 | 6800415470 | | | | | |
|---|---|---|---|---|---|---|
| Payment Amount $ | | Date | Month ▼ | / Date ▼ | / Year ▼ | |
| Fee | $ 3.00 | Waive Fee | No Waive Fee ▼ | | | |

| Acct # 5 | 6800415470 | | | | | |
|---|---|---|---|---|---|---|
| Payment Amount $ | | Date | Month ▼ | / Date ▼ | / Year ▼ | |
| Fee | $ 3.00 | Waive Fee | No Waive Fee ▼ | | | |

*Fig. 13B*

WESTERN UNION | WEB PHONE PAY

SCHEDULE A FUTURE PAYMENT
Confirmation
Account # : 6800415470

Date: Tues Aug 14 2001 14:59:32

Name on ABC Electric Account: WAYKER MATTHEW G

Address: 123 Main Street

Address:

City/State/Zip: Any Town, US 0000

Bank Name: FIRST UNION NATIONAL BANK

Account Type: Checking

Checking Account Number: 8899985896

Routing Number: 031000009

Accounts to be paid today 08/14/2001

Payment 1

Account Number 1: Amount: $150.00   Fee: $3.00   Total Amount
6800415470                                          $ 153.00

If this information is correct, press "Confirm" to finalize this transaction; otherwise, press "Modify" to make any required changes.

[Confirm]  [Modify]  [Cancel]   <u>1400</u>

Login   Select a Company   Payments   Search   Reports   Administration   Help   Logout

*Fig. 14*

WESTERN UNION | WEB PHONE PAY

SCHEDULE A FUTURE PAYMENT
Confirmation
Account # : 6800415470

Payments have been added successfully.

| | |
|---:|:---|
| Date: | Tues Aug 14 2001 14:59:32 |
| Name on ABC Electric Account: | WAYKER MATTHEW G |
| Account Number: | 6800415470 |
| Payment: | $153.00 |
| Payment Date: | Thur Aug 30 2001 |
| Transaction Confirmation #: | 555666888 |

Return to Main Menu

1500

Login  Select a Company  Payments  Search  Reports  Administration  Help  Logout

*Fig. 15*

WESTERN UNION | WEB PHONE PAY

PENDING PAYMENTS
Account # : 6800415470

Select the transaction you wish to modify.

| Type | Bank Acct # | Routing # | Amount | Payment Date | Login | Select |
|------|-------------|-----------|--------|--------------|-------|--------|
| C | *****5896 | *****00009 | $ 153.00 | 08/30/01 | bschwed | ● —1604 |
| C | *****8543 | *****00009 | $ 203.00 | 09/28/01 | bschwed | ○ —1604 |

1602

[ Modify Selected Payment ] —1606

[ Delete Selected Payment ] —1608

1600

Login  Select a Company  Payments  Search  Reports  Administration  Help  Logout

*Fig. 16*

WESTERN UNION || WEB PHONE PAY

DELETE A PENDING PAYMENT
Verification

Account # : 6800415470

| | |
|---:|:---|
| Date: | Tues Aug 14 2001 14:59:32 |
| Name on ABC Electric Account: | WAYKER MATTHEW G |
| Address: | 11406 S May |
| Address: | |
| City/State/Zip: | CHICAGO, IL 60643 |
| Total Payment: | $150.00 |
| Total Fee: | $3.00 |
| Bank Name: | FIRST UNION NATIONAL BANK |
| Account Type: | Checking |
| Account Name: | FRANKENBERRY |
| Checking Account Number: | ******5896 |
| Routing Number: | *****0009 |

Payment will be deleted.  1700

If this information is correct, press "Confirm Payment Deletion" to finalize this transaction: otherwise, press "Back" on your browser toolbar to make any required changes.

[ Confirm Payment Delection ] —1702

Login   Select a Company   Payments   Search   Reports   Administration   Help   Logout

*Fig. 17*

WESTERN UNION ‖ WEB PHONE PAY

DELETE PAYMENT
Confirmation

Payment successfully deleted.

| | |
|---:|:---|
| Date: | Tues Aug 14 2001 14:59:32 |
| Name on ABC Electric Account: | WAYKER MATTHEW G |
| Account Number: | 6800415470 |
| Payment: | $150.00 |
| Payment Date: | Thur Aug 30 2001 |
| Transaction Confirmation #: | 999888777 |

Return to Main Menu

1900

Login   Select a Company   Payments   Search   Reports   Administration   Help   Logout

*Fig. 19*

WESTERN UNION | WEB PHONE PAY

MODIFY A PENDING PAYMENT

Account # : 6800415470

| | |
|---|---|
| Name on ABC Account: | Wayker Matthew G. |
| Address: | 123 Main Street |
| | |
| City, State, Zip: | Any Town | US | 00000 |

FUNDING INFORMATION: You may select only one (1) funding method.

| | |
|---|---|
| Bank Name: | JP Morgan Chase |
| Bank Routing (ABA) #: | *****0128 |
| Bank Account #: | ******5896 |

2004

PAYMENT INFORMATION

Acct # 1   6800415470

Payment Amount $ 150.00    Date 08 / 30 / 2001

Fee   2006 — $ 3.00    Waive Fee    No Waive Fee

2002 — [Continue]   [Cancel] — 2008

2000

Login  Select a Company  Payments  Search  Reports  Administration  Help  Logout

*Fig. 20*

WESTERN UNION | WEB PHONE PAY

MODIFY A PENDING PAYMENT
Verification
Account # : 6800415470

Date: Tues Aug 14 2001 14:59:32

Name on ABC Electric Account: WAYKER MATTHEW G

Address: 123 Main Street

Address:

City/State/Zip: Any Town, US 0000

Total Payment: $150.00

Total Fee: $3.00

Bank Name: JP Morgan Chase

Account Type: Checking

Checking Account Number: ******5896

Routing Number: *****0128      2100

Accounts to be paid today 08/30/2001
Payment 1
Account Number 1:   Amount: $150.00   Fee: $3.00   Total Amount
6800415470                                                                           $ 153.00

If this information is correct, press "Confirm" to finalize this transaction; otherwise, press "Modify" to make any required changes.

[Confirm]  [Modify]  [Cancel]
 2102         2104         2106

Login  Select a Company  Payments  Search  Reports  Administration  Help  Logout

*Fig. 21*

WESTERN UNION | WEB PHONE PAY

PAYMENT HISTORY
Account # : 6800415470

| Payment Type | Bank Acct # | Routing # | Amount | Pay Date | Confirmation Number | Returned? | Reason | Login |
|---|---|---|---|---|---|---|---|---|
| C | *****5896 | *****00009 | $66.00 | 02/26/01 | 222555888 | N | | bschwed |
| C | *****5896 | *****00009 | $55.00 | 02/10/01 | 111444777 | N | | bschwed |
| C | *****5896 | *****00009 | $32.00 | 01/18/01 | 333666999 | Y | NSF | bschwed |
| C | *****5896 | *****00009 | $87.00 | 12/18/00 | 777555333 | Y | NSF | bschwed |
| C | *****5896 | *****00009 | $44.00 | 12/12/00 | 999555111 | N | | bschwed |
| C | *****5896 | *****00009 | $73.00 | 11/09/00 | 666222444 | N | | bschwed |

[ Return to Main Menu ]  —2004

2202

2200

Login  Select a Company  Payments  Search  Reports  Administration  Help  Logout

*Fig. 22*

WESTERN UNION | WEB PHONE PAY

PAYMENT SEARCH

SELECT SEARCH CRITERIA

Activity Date  From:
Month ▼ / Date ▼ / Year ▼  — 2304

To:
Month ▼ / Date ▼ / Year ▼  — 2306

Account Number [_____] — 2302

2300

[Search]  [Cancel]

ENTER SEARCH CRITERIA  — 2308

Transaction Confirmation Number [333444555]

2308 — [Search]  [Cancel] — 2310

Login  Select a Company  Payments  Search  Reports  Administration  Help  Logout

*Fig. 23*

WESTERN UNION | WEB PHONE PAY

REPORTS

| Report Type | Dates | | Filter | |
|---|---|---|---|---|
| Completed Transactions | From: To: | Month / Date / 2402 Year<br>Month / Date / Year | 2404<br>All ▼ | View |
| Pending Transactions | From: To: | Month / Date / 2402 Year<br>Month / Date / Year | 2404<br>All ▼ | View |
| Deleted Transactions | From: To: | Month / Date / 2402 Year<br>Month / Date / Year | 2404<br>All ▼ | View |
| Returned Transactions | From: To: | Month / Date / 2402 Year<br>Month / Date / Year | 2404<br>All ▼ | View |
| Fee Waive For Date Range | From: To: | Month / Date / 2402 Year<br>Month / Date / Year | 2404<br>All ▼ | View |
| Fee Waived By Reason Waived | From: To: | Month / Date / 2402 Year<br>Month / Date / Year | 2404<br>All ▼ | View |

2400

Login   Select a Company   Payments   Search   Reports   Administration   Help   Logout

*Fig. 24*

WEB-BASED PAYMENT SYSTEM AND METHOD

CROSS-REFERENCES TO RELATED APPLICATIONS

This application is a non-provisional of and claims priority to Provisional U.S. Patent Application No. 60/339,732, entitled, "WEB-BASED PAYMENT SYSTEM AND METHOD", filed on Dec. 10, 2001, by Patricia A. Frazier, David T. Shapiro, and Marilyn J. Bethke, which application is incorporated herein in its entirety for all purposes.

BACKGROUND OF THE INVENTION

This invention relates generally to the field of financial transactions. This invention relates more particularly to systems and methods for collecting payment information from consumers and processing payments through electronic funds transfers.

Merchants often provide products and/or services to consumers in return for a promise to pay in the future. However, consumers sometimes do not fulfill their obligation and a certain portion of a merchant's accounts receivable goes unpaid. In attempting to collect on its accounts receivable, a merchant typically weighs the cost of further efforts to collect from a consumer against the amount owned by the consumer and the likelihood that the additional efforts will be successful.

Electronic funds transfers provide a convenient method for collecting money from consumers. For example, if a merchant engages a collector to obtain payment from a consumer, the collector may contact the consumer by phone and obtain payment account information and receive permission from the consumer to process a transaction. However, a consumer attempting to avoid an obligation may provide false or inaccurate information to the collector. Further, unbeknownst to the collector, the consumer may have avoided this or similar obligations in the past, also by providing false information. Thus, systems and methods are needed that provide instant verification of payment account information and compile historical payment information that may be used to detect efforts to circumvent payment of debts. Such systems and methods generally also would make debt collection more efficient.

BRIEF SUMMARY OF THE INVENTION

Embodiments of the present invention thus provide a payment processing system having a host computer system configured to receive payment information via a network from a client computer, a data storage arrangement configured to store the payment information, and a settlement engine. The settlement engine is configured to receive payment information from the host computer system, initiate payment processing by transmitting a file comprising at least a portion of the payment information to a first financial institution, and transmit a message to a client computing system. The message includes at least a portion of the payment information. The settlement engine may be configured to receive payment information from the data storage arrangement. The host computer system may be configured to respond to requests for historical payment information by transmitting an electronic file to a user computer. The electronic file may include payment information. The electronic file may include payment information from a particular consumer covering a specified period of time. The electronic file may include payment information to a particular client covering a specified period of time.

In another embodiment, a payment processing method includes receiving at a host computer system payment information from a client computer. The payment information relates to a payment from a consumer. The method also includes verifying at least a portion of the payment information, storing at least a portion of the payment information in a database, transmitting a first electronic file comprising at least a portion of the payment information to a financial institution, thereby initiating processing of the payment, transmitting a second electronic file comprises at least a portion of the payment information to a client computing system, and responding to a request for historical information by transmitting to a user computer system a third electronic file comprising at least a portion of the payment information.

The method also may include initiating an electronic transfer of funds to a client's financial institution representing the payment. The method also may include receiving an electronic transfer of funds from a consumer's financial institution representing the payment. The electronic transfer of funds to a client's financial institution may be initiated prior to receipt of the electronic transfer of funds from a consumer's financial institution. The method also may include receiving an electronic message comprising a rejection of the payment from a consumer's financial institution. The method also may include initiating an electronic withdrawal of funds from the client's financial institution. The method also may include transmitting to the client computing system a fourth electronic file that includes revised payment information. The third electronic file also may include payment information from a particular consumer covering a specified period of time. The third electronic file may include payment information to a particular client covering a specified period of time. The first electronic file may include additional payment information from a least one additional customer. The first electronic file may include information representing a rejection of an attempt to withdraw funds from a consumer's financial institution.

The payment information may include a checking account of the consumer from which the payment is to be made. The payment information may include a credit card account of the consumer from which the payment is to be made. The payment information may include a debit card account of the consumer from which the payment is to be made. The step of verifying at least a portion of the payment information may include contacting the client's computer system to obtain information relating to the payment information. The step of verifying at least a portion of the payment information may include consulting an electronic file provided by a client to obtain information relating to the payment information. The step of verifying at least a portion of the payment information may include using an algorithm specified by a client to evaluate at least a portion of the payment information. The step of using an algorithm specified by a client to evaluate at least a portion of the payment information may include checking the arrangement of numbers in an account number of the payment information. The step of verifying at least a portion of the payment information may include consulting a third party service to verify an ABA routing number of the payment information. The third party service may be provided by Thompson Financials.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

FIG. 7 illustrates a Supervisor Authorization display screen according to embodiments of the present invention.

FIG. 8 illustrates an Initiate a New Payment display screen according to embodiments of the present invention.

FIGS. 9A and 9B illustrate an Additional Payments display screen according to embodiments of the present invention.

FIG. 10 illustrates a New Payment Confirmation display screen according to embodiments of the present invention.

FIG. 11 illustrates a New Payment Final Confirmation display screen according to embodiments of the present invention.

FIG. 12 illustrates a Schedule a Future Payment display screen according to embodiments of the present invention.

FIGS. 13A and 13B illustrate a Schedule Multiple Future Payments display screen according to embodiments of the present invention.

FIG. 14 illustrates a Future Payments Confirmation display screen according to embodiments of the present invention.

FIG. 15 illustrates a Future Payments Final Confirmation display screen according to embodiments of the present invention.

FIG. 16 illustrates a Pending Payments display screen according to embodiments of the present invention.

FIG. 17 illustrates a Delete Payment Confirmation display screen according to embodiments of the present invention.

FIG. 19 illustrates a Delete Payment Final Confirmation display screen according to embodiments of the present invention.

FIG. 20 illustrates a Modify a Pending Payment display screen according to embodiments of the present invention.

FIG. 21 illustrates a Modify a Pending Payment Verification display screen according to embodiments of the present invention.

FIG. 22 illustrates a Payment History display screen according to embodiments of the present invention.

FIG. 23 illustrates a Payment Search display screen according to embodiments of the present invention.

FIG. 24 illustrates a Reports display screen according to embodiments of the present invention.

DETAILED DESCRIPTION OF THE INVENTION

Figure 1:
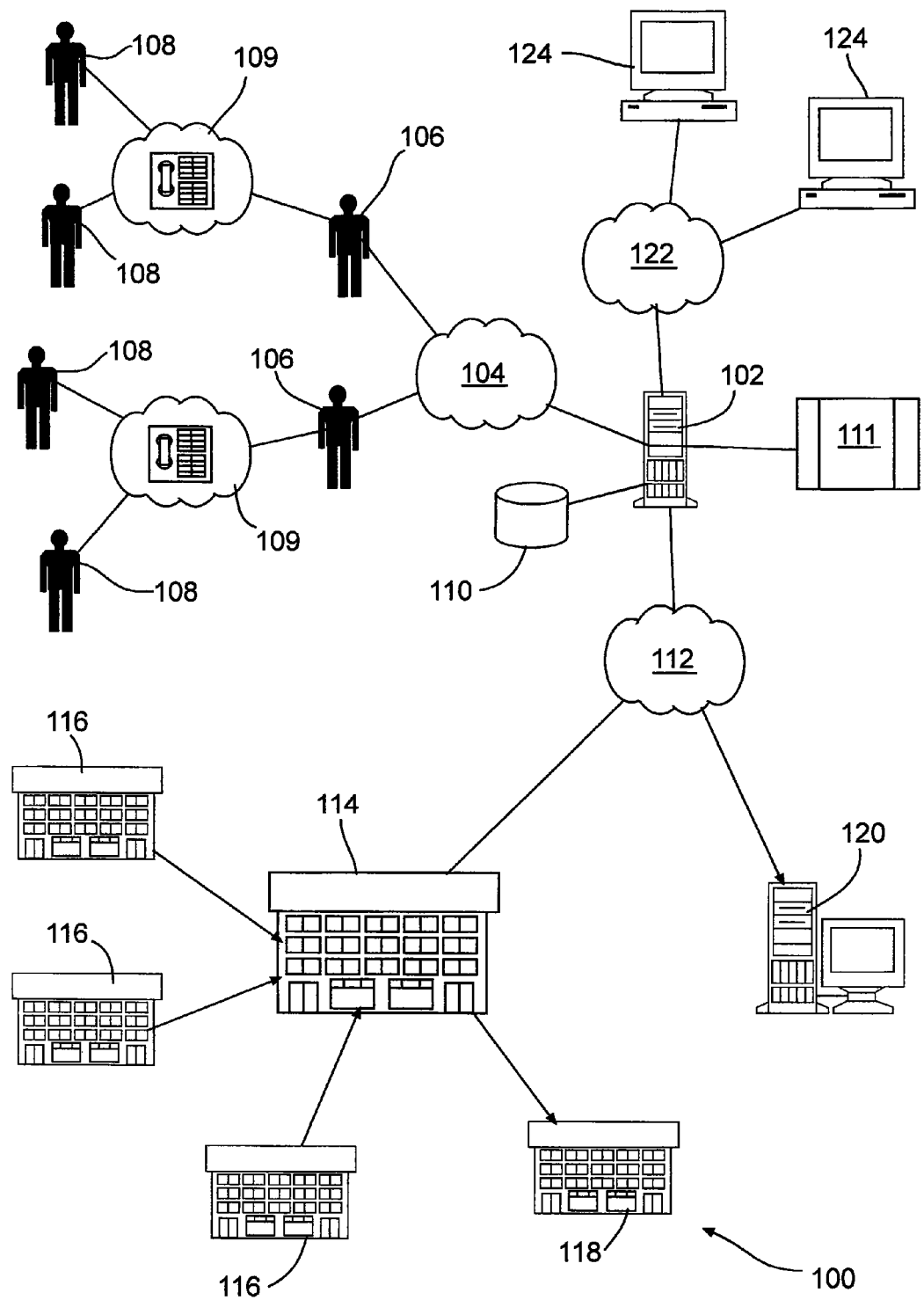
FIG. 1 illustrates a system for collecting payment information from consumers and processing payments through electronic funds transfers.

The present invention provides a payment processing system that may be accessed and used via the Internet or other network. The system provides the capability for servicing a number of clients simultaneously. Historical information is compiled, which assists the process of collecting from consumers. Built in verification processes further simplify the process of collecting from consumers and frustrate attempts by consumers to provide false or inaccurate information.

According to the present invention, an operator of a payment processing system provides access to its clients or their representatives via a network, such as the Internet. Clients may include retailers, banks, utility companies, or other such merchants that routinely provide merchandise or services to consumers on credit. The clients may use the system to provide a convenient method for their consumers to pay their debts, or the clients may use the system particularly for collecting on past due accounts. In either case the clients or third parties, such as collectors, acting on behalf of the clients, attempt to contact a consumer with an outstanding account balance. (Hereinafter, the term "collector" will be understood to refer to a person employed by a client working exclusively for the client, or a person not directly employed by a client but working on the client's behalf. A collector also may work for a number of different clients.) Collectors typically contact consumers by telephone, although different methods for contacting consumers is certainly possible. Once the collector is in contact with the consumer, the collector may obtain payment information from the consumer.

Payment information may include a checking account number and a bank identification number, such as an ABA (American Banking Association) number or Routing and Transit number. Additionally or alternatively, the payment information could include a credit card number or other account number that allows non-signatory payment authorization (e.g., telephone authorization). Other payment information may include the consumer's name and address, the client's name and address, a payment date, and the like. The collector assimilates the payment information by entering it into data fields of display screens transmitted by a host computer system to a computer used by the collector. The display screens may comprise web pages, and the collector may use a web browser to view the pages and interact with the host computer system that generates the web pages. As the data is entered, for example, as each data field is completed or as a page of data is completed, the data is transmitted to the host computer system.

As the host computer system receives the payment information, the host computer system may verify some or all of the information. Thus, if a consumer provides the collector with false, misleading, or inaccurate information, the collector may request correct information while still in contact with the consumer. Because some consumers having past due accounts may be notoriously difficult to contact, the present invention is particularly useful to clients because it may help to avoid needless repetition. For example, a collector having the means of the present invention to verify payment information in real time does not have to repeatedly contact the consumer to get revised information. If the consumer is providing incorrect information, in many cases, the collector knows right away. Further, being able to verify information also allows the collector to assess whether the consumer is truly attempting to satisfy an obligation. If a consumer continues to provide useless payment information, then the client is sooner able to transfer a past due account to the next stage of collections. Thus, the present invention may significantly reduce the amount of time wasted attempting to contact delinquent consumers and then re-contacting those consumers over the course of weeks or months attempting to get reliable payment information, only to eventually find out that the account must be written off. Of course, the verification process of the present invention also streamlines collection from paying clients who mistakenly provide inaccurate payment information.

In addition to verifying the validity of account numbers, balances, and the like, the present invention also may evaluate a consumer's payment history. For example, because the present invention stores historical payment information relating to consumers, a collector may be able to view a consumer's history with respect to NSF checks. As with a paper check, a checking account debit via an electronic funds transfer also may result in a return due to insufficient funds being in the consumer's checking account to cover the amount of the payment. Thus, if the consumer accumulates a history of NSF checks, collectors may be required to collect from consumers using other means, such as credit cards, or obtain a supervisor's approval.

Once acceptable payment information is received, the present invention initiates an electronic funds transfer to collect the funds from the consumer's bank and deposit the funds in a client's bank. Transfers may involve the federal funds network, the ACH (Automated Clearing House) network, or other acceptable electronic funds transfer system. Further, the present invention may include processes for complying with various federal and state laws regulating electronic funds transfers, particularly telephone-authorized transfers. For example, the present invention may cause a confirmation letter to be printed and sent to a consumer following an authorization by the consumer to transfer money from the consumer's checking account.

In addition to initiating the electronic funds transfer, the present invention also may be configured to transmit payment information directly to a client's accounting system. This further simplifies the collection process for clients. In some embodiments, operators of the present invention may transfer funds to the client's bank even before the operator receives the funds from the consumer's bank. Of course, the operator may need to withdraw the funds from the client's bank if the operator does not eventually receive payment from the consumer's bank. However, according to the present invention, transfers among financial institutions may be consolidated, thus lowering the cost to complete the transactions.

Many additional features are included in some embodiments of the present invention. For example, the present invention provides collectors the ability to schedule future payments, and to modify or cancel, pending payments. Also, the present invention provides authorized users with the ability to view historical information relating to certain clients and consumers. Further, operators of systems according to the present invention may customize various features to suit the needs of their clients, and different clients may have different features.

Having described the present invention generally, attention is directed to FIG. 1, which illustrates one possible embodiment of a system according to the present invention. However, those skilled in the art will realize a number of possible configurations for systems according to the present invention that differ from the system of FIG. 1. Thus, the system of FIG. 1 should be considered a non-limiting example.

FIG. 1 illustrates a web-based payment system 100 according to the present invention. The system 100 includes a host computer system 102. The host computer system 102 may be, for example, a server computer, a personal computer, a workstation, or other suitable computing device. The host computer system 102 includes application software that programs the host computer system 102 to perform one or more methods according to the present invention. For example, application software resident on the host computer system 102 may program the host computer system 102 to act as a web site server.

The system 100 also includes a first network 104. The network 104 may be the Internet, an intranet, a wide area network (WAN), a local area network (LAN), a virtual private network, any combination of the foregoing, or the like. Through the network 104, collectors 106 may access the host computer system 102.

The collectors 106 act on behalf of clients to collect funds from consumers 108. Collectors 106 may be employed by clients as employees or contract agents, for example. Collectors 106, particularly contract collectors, may work for multiple clients simultaneously. The clients may be merchants, financial institutions, or other entities owed money by consumers. Thus the clients of the web-based payment system operator are creditors of the consumers/debtors from whom payment is sought.

A collector 106 may access the host computer system 102 using any suitable computing device. The network connection may be a wired connection or a wireless connection, as is known in the art. Also as is known in the art, the host computer system 102 may transmit electronic files comprising web pages to be displayed on a display screen for viewing by the collector 106. The collector 106 then may enter data into data fields on the web pages and transmit the data back to the host computer system 102. This process will be explained further hereinafter.

Collectors 106 may contact consumers 108 through, for example, a telephone network 109, or the like. If a collector 106 is successful obtaining payment information from a consumer 108, then the collector 106 enters the payment information into appropriate data fields of the web pages. The payment information may include, for example, an ABA routing number, an account number, name and address information, a payment amount, and the like. Once entered, the information is transmitted to the host computer system 102.

Once payment information is received, the host computer system 102 may store the information in a suitable storage arrangement associated with the host computer system 102, such as a database 110. The information is then used by a settlement engine 111 to initiate the necessary transactions among the appropriate accounts. The settlement engine 111 may be a separate computing device from the host computer system 102. The two computing devices may be co-located, or may be connected from different locations via a network. In some embodiments, the settlement engine 111 comprises software residing on the host computer system 102 that programs it to perform functions according to the present invention. For example, through a second network 112, the settlement engine 111 may send an electronic file comprising the transaction information to a financial institution 114 associated with the operator of the system 100. The operator's financial institution 114 or ODFI (Originating Depository Financial Institution) may be any of a number of financial institutions, such as a bank, a savings & loan, or the like. The second network 112 may be any appropriate communications network. In some embodiments, the second network 112 is the ACH network.

The ODFI 114, through the federal funds network, obtains the funds from a consumer's bank 116, and deposits the funds into a client's bank 118. The process of transferring funds through the federal funds network is well known. However, in some embodiments of the present invention, the operator may deposit funds relating to a transaction into the client's bank 118 before the operator receives the funds from the consumer's bank 116. Thereafter, it may become necessary for the operator to reverse such transactions. For example, if a consumer does not have the necessary funds, the operator may be required to withdraw the funds from a client's bank 118.

The settlement engine 111 also may send transaction information to a client's computing system 120. This allows the client to properly account for the funds collected and allocate the funds to the appropriate consumer's account.

The system 100 also includes a third network 122 through which access terminals 124 may interface with the host computer system 102. The access terminals 124 may be any suitable computing device. They may reside at one or more operator sites, client sites, collector sites, or the like. Appropriate security features may prevent access by unauthorized users, or allow various levels of access to authorized users. The access terminals 124 may be used to generate reports from the system 100, to perform maintenance on the system 100, and to accomplish other functions related to the present invention. The third network 122 may be any suitable communications network, such as those previously described. In some embodiments, the first, second, and third networks 104, 112, 122, may comprise the same network.

Figure 2A:
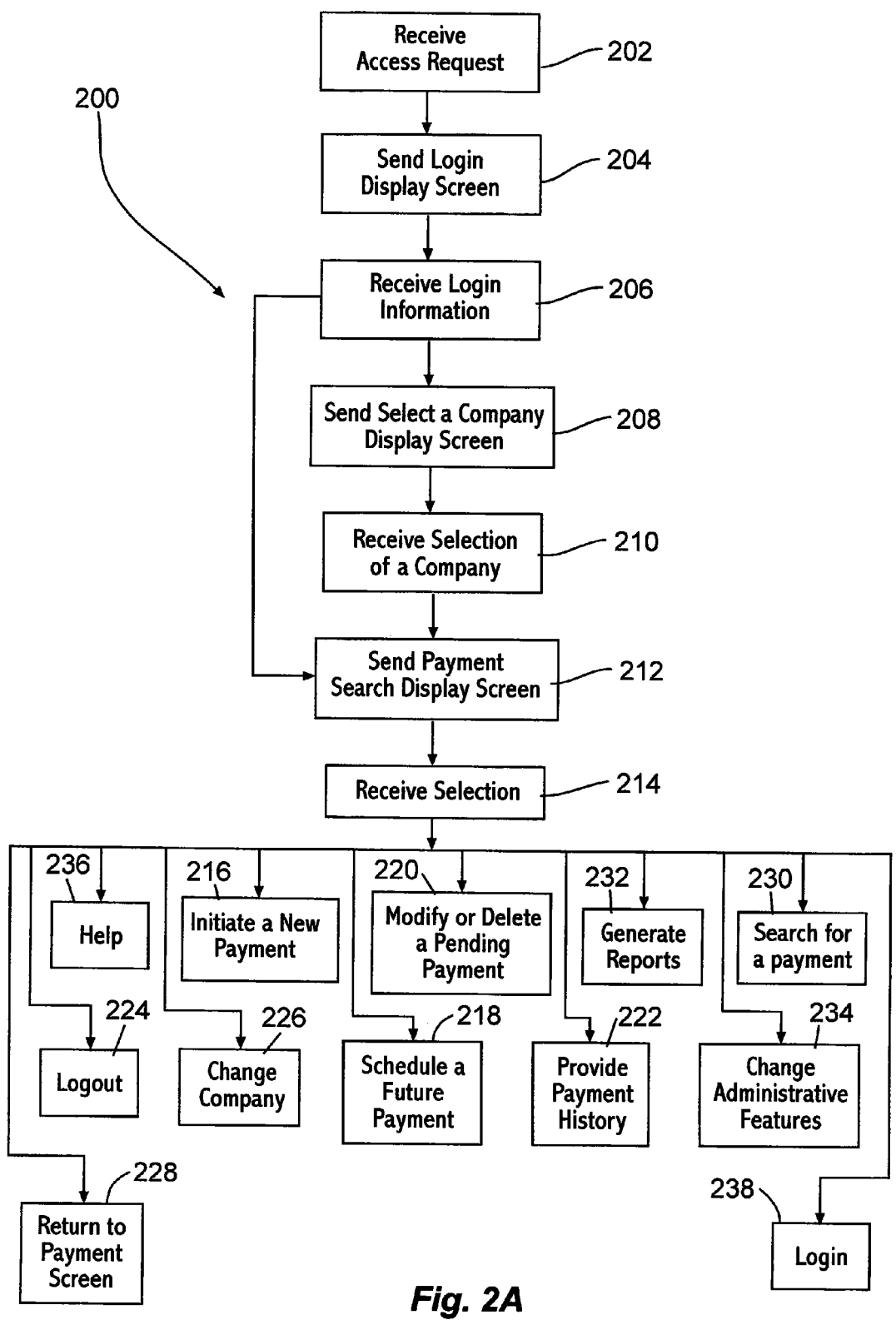
FIGS. 2A-C illustrate methods for collecting payment information from consumers and processing the payments according to embodiments of the present invention. The methods may be implemented in the system of FIG. 1.
Figure 3:
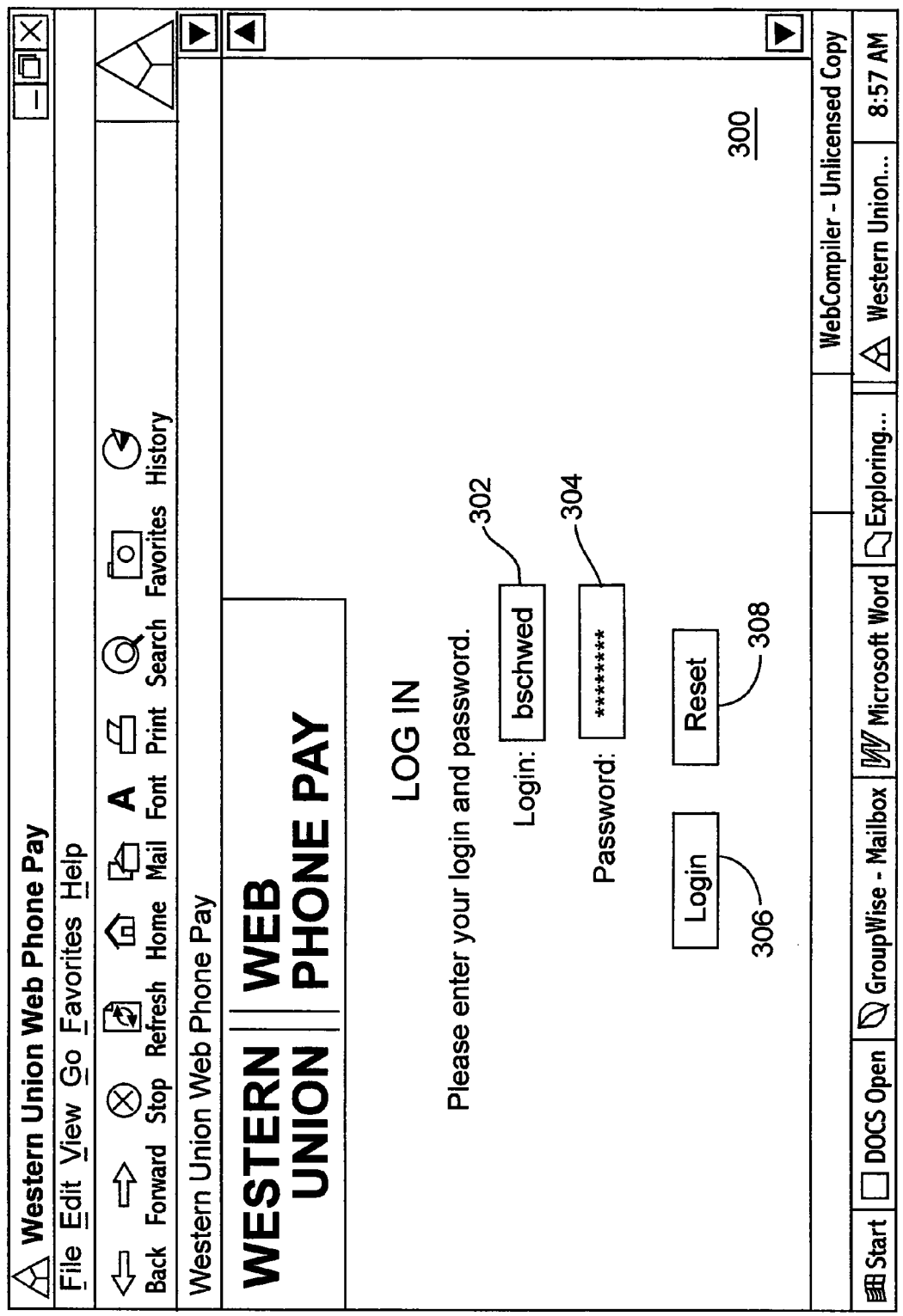
FIG. 3 illustrates a Login display screen according to embodiments of the present invention.

Having describe a web-based payment system 100 according to the present invention, a method of performing web-based payments according to the present invention will be described. FIG. 2A illustrates such a method 200. The method 200 begins at operation 202 when the host computer system 102 receives a request, such as from a collector 106, to access the system. In response, at operation 204, the host computer system 102 transmits a file comprising a Login display screen 300 of FIG. 3. The Login display screen 300 includes a Login ID data field 302, a Password data field 304, a Login button 306, and a Reset button 308.

As mentioned previously, the login procedure may include security features that prevent unauthorized access, and/or provide various levels of user access. For example, the web address (i.e., URL) may be unique to each client, and only pre-authorized IP addresses may be allowed to access the URL. Other examples are possible.

At operation 206, the host computer system 102 receives the login information. Depending on the login information, the host computer system 102 may allow or deny access. If access is allowed, depending on the user identified by the login information, the host computer system 102 may transmit a Payment Search display screen 400 (FIG. 4) or a Select a Company display screen 500 (FIG. 5). For example, if a collector works on behalf of many different creditors, the collector then may be required to select one of the creditors from a dropdown menu 502 of FIG. 5 to indicate which client the collector is currently working for. In this case, the host computer system 102 transmits the select company page 500 at operation 208 and receives a selection at operation 210. If the collector works on behalf of only one client, then operations 208 and 210 may not be necessary. In either case, once a client is identified, the Payment Search display screen 400 is transmitted by the host computer system 102 at operation 212. The Payment Search display screen 400 identifies the name 402 of the client.

At operation 214, the host computer system 102 receives a selection from a collector (or other user). For example, using a button on the Payment Search display screen 400, a collector may elect to initiate a new payment at operation 216 (New button 404), schedule a future payment at operation 218 (Future button 406), modify or delete a pending payment at operation 220 (Pending button 408), or view a history of processed payments at operation 222 (History button 410). Additionally, a collector or other user may: logout by selecting a Logout button 412 at operation 224; select a different company using the Select a Company button 414 at operation 226; return from another display screen to the Payment Search display screen 400 by selecting the Payments button 416 at operation 228; search for payments or other information by selecting the Search button 418 at operation 230; print reports by selecting the Reports button 420 at operation 232; create, view, or update administrative features by selecting the Administration button 422 at operation 234; obtain help by selecting the Help button 424 at operation 236; and/or log back into the system (for example if logged off due to time out) by selecting the Login button 426 at operation 238. As mentioned previously, security features may be used to control access to the function described above. Further, many of these functions may be available from other display screens. Some of the functions may require the collector to enter a consumer account number in an Account Number field 428.

Figure 6:
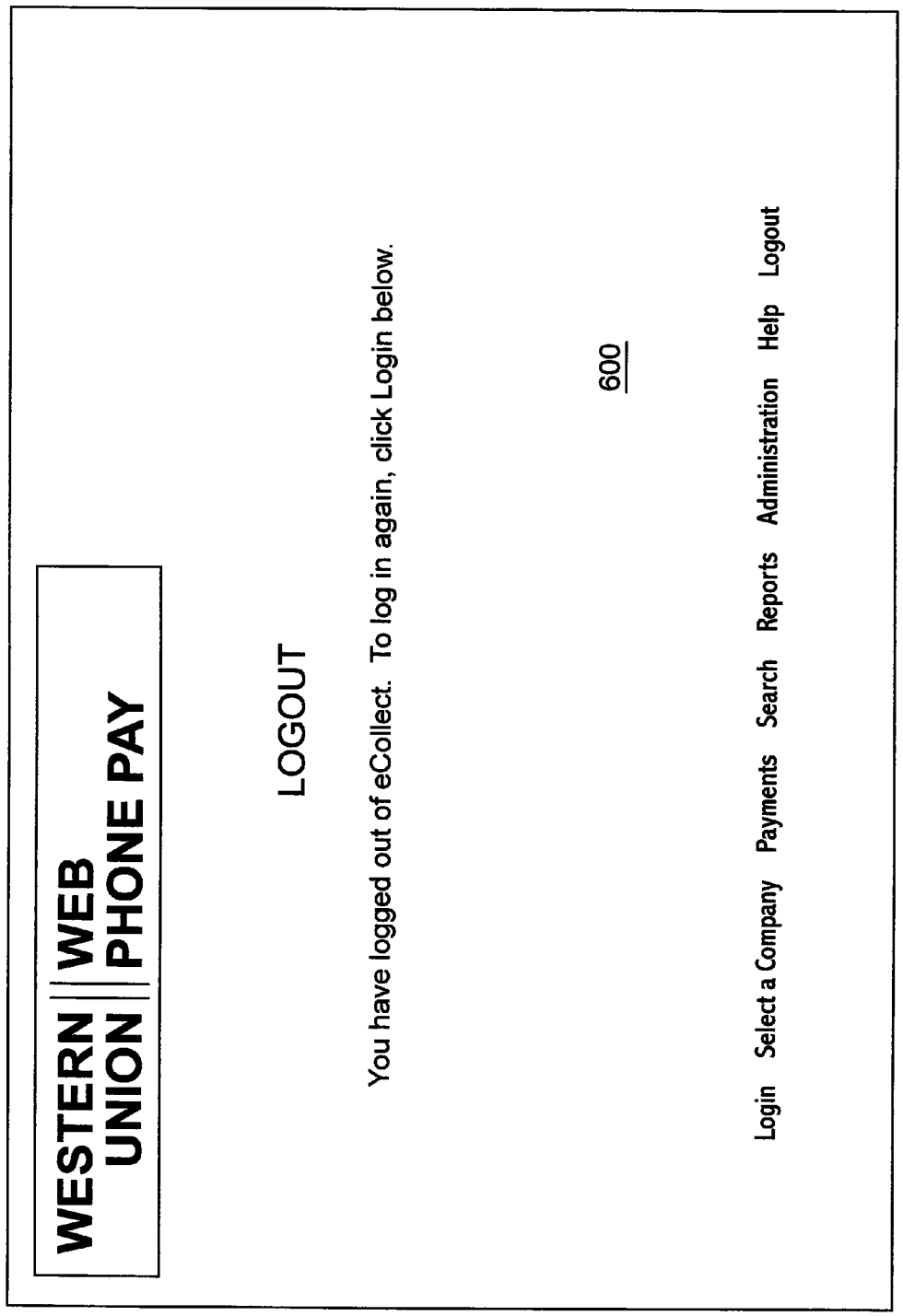
FIG. 6 illustrates a Logout display screen according to embodiments of the present invention.
Figure 18:
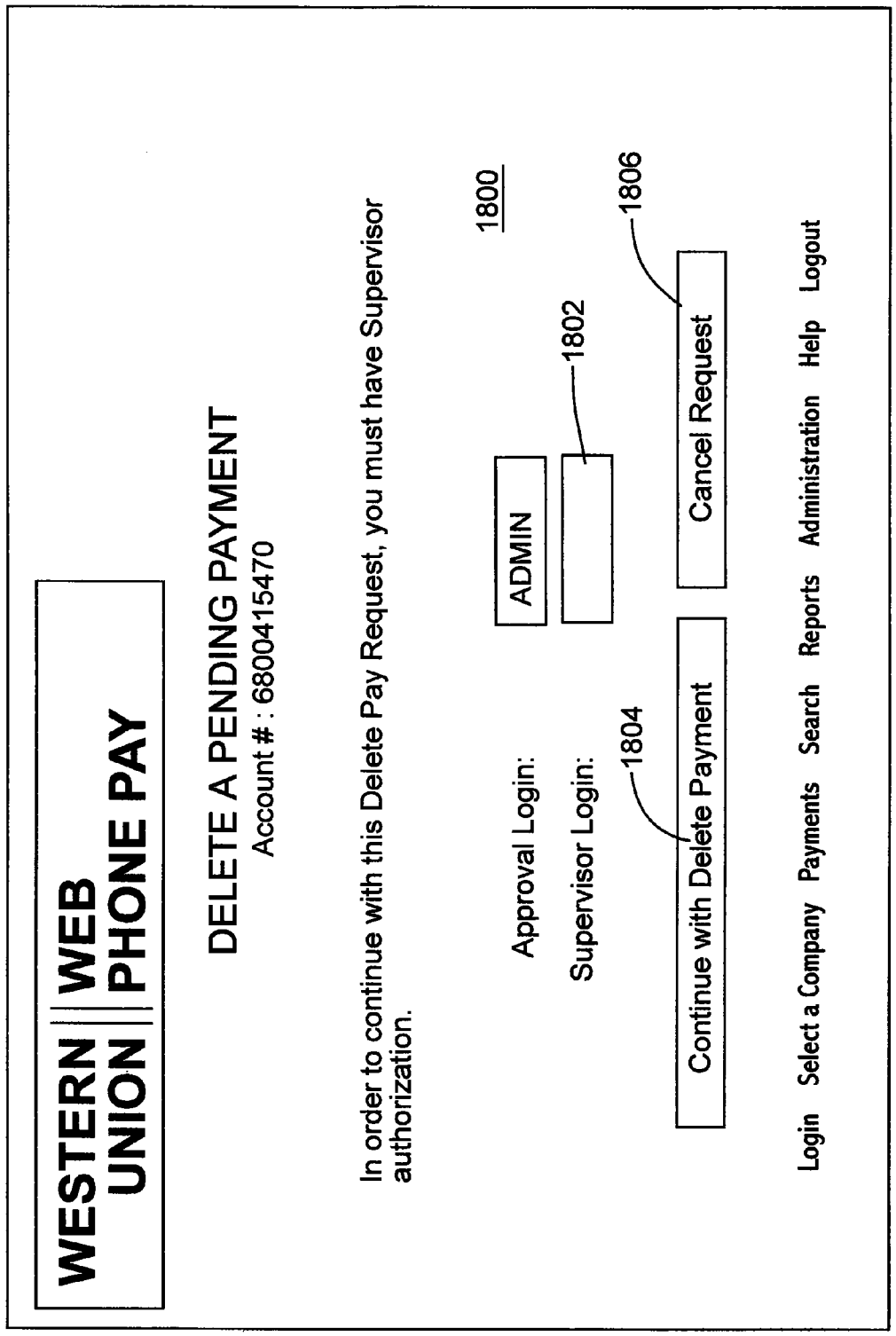
FIG. 18 illustrates a Supervision Approval to Delete Payment display screen according to embodiments of the present invention.

If the collector or other user selects the Logout button 412, the host computer system 102 may transmit a Logout display screen 600 (FIG. 6) at operation 224 to be displayed at the collector's or other user's computing device. The Logout display screen 600 also may appear in response to the collector being logged off due to a timeout, for example, which may occur after a predetermined period of inactivity.

Figure 2B:
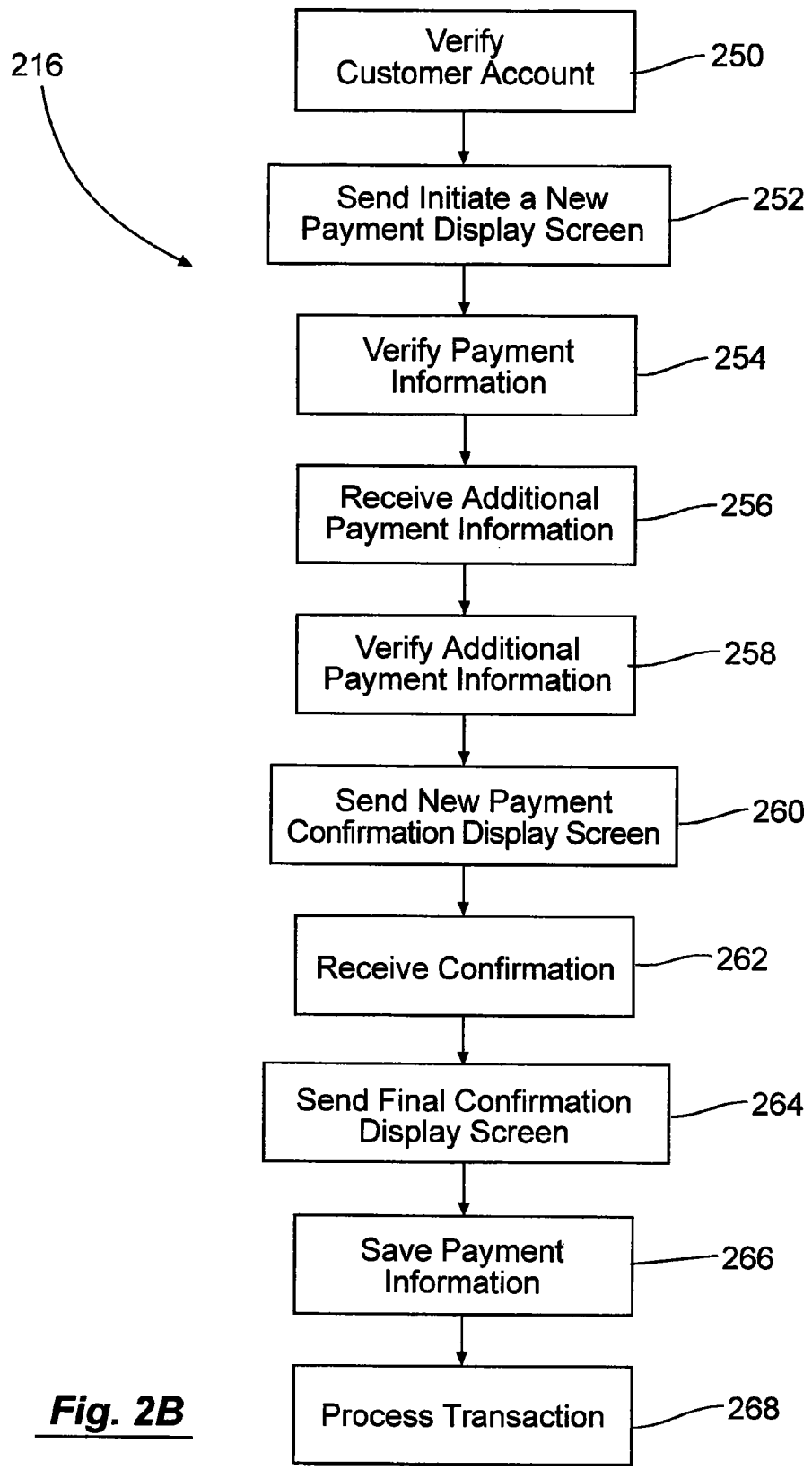

FIG. 2B illustrates the Initiate a New Payment operation 216 in greater detail, according to some embodiments of the present invention. As mentioned previously, some of the selections from the Payment Search display screen 400 may require entering a consumer account number in the Account Number field 428. Thus, at operation 250 the host computer system 102 verifies the consumer account number. If the account number if not valid, the host computer system 102 may transmit an invalid account display screen, such as the Supervisor Authorization display screen 700 of FIG. 7. Depending upon the reason for invalidity, it may be possible to continue with the process of initiating a new payment.

An account number may be verified in any of several ways. For example, the host computer system 102 may transmit account information to the client's computing system for verification. In other embodiments, a file may be sent to a third party site related to the client. In still other embodiments, the client periodically may supply files containing valid and/or invalid account numbers that the host computer system 102 stores and uses to verify accounts prior to processing payments. Further still, client-defined algorithms may be used to verify account numbers. Many other examples are possible.

Once an account number is validated or approved, the host computer system 102 may transmit an Initiate a New Payment display screen 800 (FIG. 8) at operation 252. At this point, it may be the case that a collector, such as a client customer service representative, has contacted a consumer/debtor and obtained authorization to initiate a payment from the consumer to the client/creditor. Thus, the Initiate a New Payment display screen 800 includes a number of data fields to be completed to initiate the transaction. The data fields include: Name 802 and Address 804, ABA Routing Number 806; Account Number 808; and Payment Amount 810 data fields.

In some embodiments, some of the data fields may be pre-populated with information relating to the consumer and/or client. For example, a Pay to the Order Of field 812 may be pre-filled with the client's name. In other embodiments, information may be returned to the host computer system 102 upon verification of the account number. The consumer's Name and Address field 802, 804 may be completed in this way. In some embodiments, information may come from a client's computing system 120. The information may have been supplied previously, or the information may be obtained real time from the client's computing system 120, or a third party computing system related to the client. In still other embodiments, information may be obtained from history files associated with the host computer system 102, having been stored previously, for example, at the database 110. Payment information may be supplied in this manner. For example, if the consumer previously paid by credit card, the consumer's credit card number may appear in the Account Number field 808, although some of the digits may be masked. In yet other embodiments, other information may be supplied in response to the entry of certain information, for example, supplying the city and state from a database upon the entry of a zip code. Other embodiments are possible, including any combination of the foregoing.

The ABA Routing Number field 806 and the Account Number field 808 may comprise a MICR line 814, similar to those found on a paper check. As this information is entered by the user, verification systems may be used to verify account numbers, account balances, account status, and the like. For example, a service, such as that provided by Thompson Financials, may be used to verify a bank name once the consumer supplies an ABA routing number. Further, credit card accounts may be verified and/or debited as the information is entered by the user. In any of the foregoing examples, warning screens may be used to provide the user with information relating to the success or failure of attempts to charge and/or verify accounts and account information. Verification of payment information is shown as operation 254.

In some embodiments, consumers are changed a fee for payments made according to the present invention. In other embodiments, no fee is charged. In still other embodiments, a drop down menu 812 may be used to selectively waive a fee. Embodiments that include an ability to waive a fee also may include a data filed or drop-down menu for selecting or providing a reason for waiving a fee. Further to such embodiments, fee waivers may require supervisor approval, in which case additional display screens may be included for requesting and receiving supervisor approval for fee waivers.

A collector may add additional payments from the same consumer by selecting an Add Payments button 814, abort the transaction by selecting a Cancel button 816, or initiate the payment according to the information in Initiate a New Payment display screen 800 by selecting a Continue button 818. If the collector selects the Add Payments button 814, shown as operation 256, an Additional Payments display screen 900 (FIGS. 9A and 9B) is displayed, which has data fields similar to the ones discussed above for including additional payment information.

Selecting the Continue button 820 causes a New Payment Confirmation display screen 1000 (FIG. 10) to be displayed at operation 260. The New Payment Confirmation display screen 1000 includes a Payment Information Confirmation section 1002, a Confirm button 1004, a Modify button 1006, and a Cancel button 1008. A user, such as a client CSR, may confirm the transaction by selecting the Confirm button 1004 at operation 262, in which case a New Payment Final Confirmation display screen 1100 (FIG. 11) is displayed at operation 264. Selecting the Modify button 1006 causes the Initiate a New Payment display screen 800 (FIG. 8) to be redisplayed, or the Additional Payments display screen 900 (FIGS. 9A and 9B), if multiple payments are being confirmed. This allows the user to modify any incorrect information. Selecting the Cancel button 1008 aborts the transaction. The New Payment Final Confirmation display screen 1100 (FIG. 11), includes a Payment Summary area 1102 and a Return to Main Menu button 1104. Selecting the Return to Main Menu button 1104 causes the Payment Search display screen 400 (FIG. 4) to be displayed, from which additional payments or other functions may be selected. Selecting the Confirm button 1004 also causes the payment information to be stored at operation 266 and initiates a Process Transaction operation at operation 268.

Figure 2C:
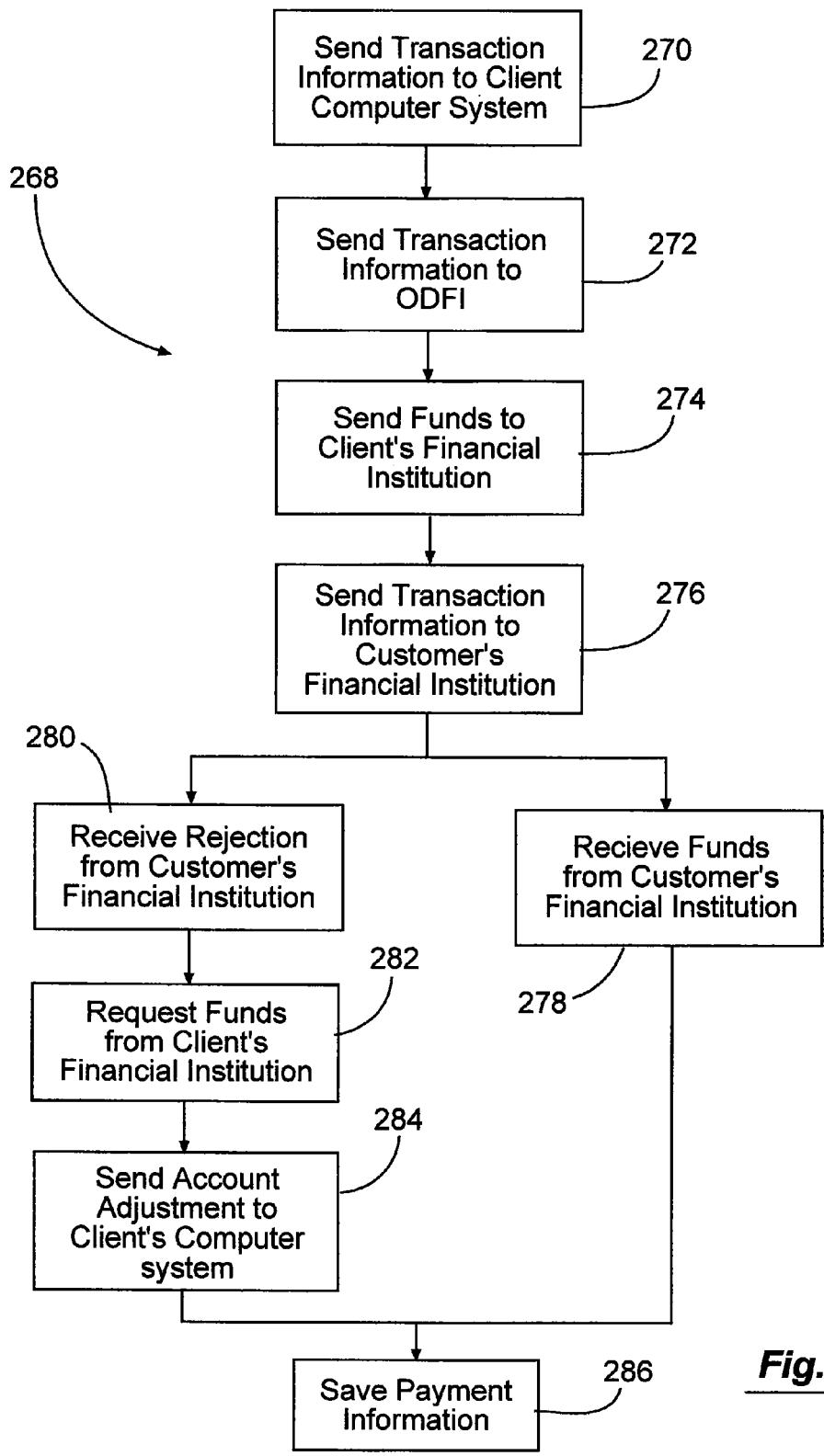

The Process Transaction operation 268 is illustrated in greater detail in FIG. 2C. The operation may take place immediately upon confirmation of the transaction, or may be performed as part of a batch process, having been consolidated with other, potentially related transactions. At operation 270 transaction information is sent to a client computer system 120. This operation may result in transaction information being posted directly to consumers' accounts at the client computer system. At operation 272 transaction information is sent to the system operator's ODFI. The ODFI may be, for example, the operator's bank. In some embodiments, the ODFI transfers funds to the client's financial institution at operation 274 even before the ODFI receives funds from the consumer's financial institution. The ODFI initiates an electronic funds transfer through the Federal Funds Network, or similar electronic funds transfer network, at operation 276 by sending transaction information to the consumer's financial institution. This operation 276 may involve first sending the transaction information to a clearing bank, depending on the procedures used by the electronic funds network being used.

In some circumstances, funds are later received through the funds network from the consumer's financial institution at operation 278. However, in some circumstances, the consumer's financial institution rejects the transaction at operation 280, for example, because the consumer has stopped payment, does not have the funds in his account, or the like. In these instances, the ODFI requests a return of funds from the client's bank at operation 282, and sends an adjustment to the consumer's account in the client's computer system at operation 284. In either of the above cases, the payment information is revised accordingly and saved at operation 286.

As mentioned previously, according to embodiments of the present invention, several transactions may be consolidated prior to initiating transactions through the funds network. This reduces the charges associated with processing such transactions. For example, a number of payments may have been processed for a particular client in a given processing period. During the same period, one or more payments processed in previous periods may have been rejected by consumers' financial institutions. In such cases, the funds deposited (or withdrawn) from the client's financial institution may represent the net result of the two. This process further reduces the transaction processing costs.

Figure 4:
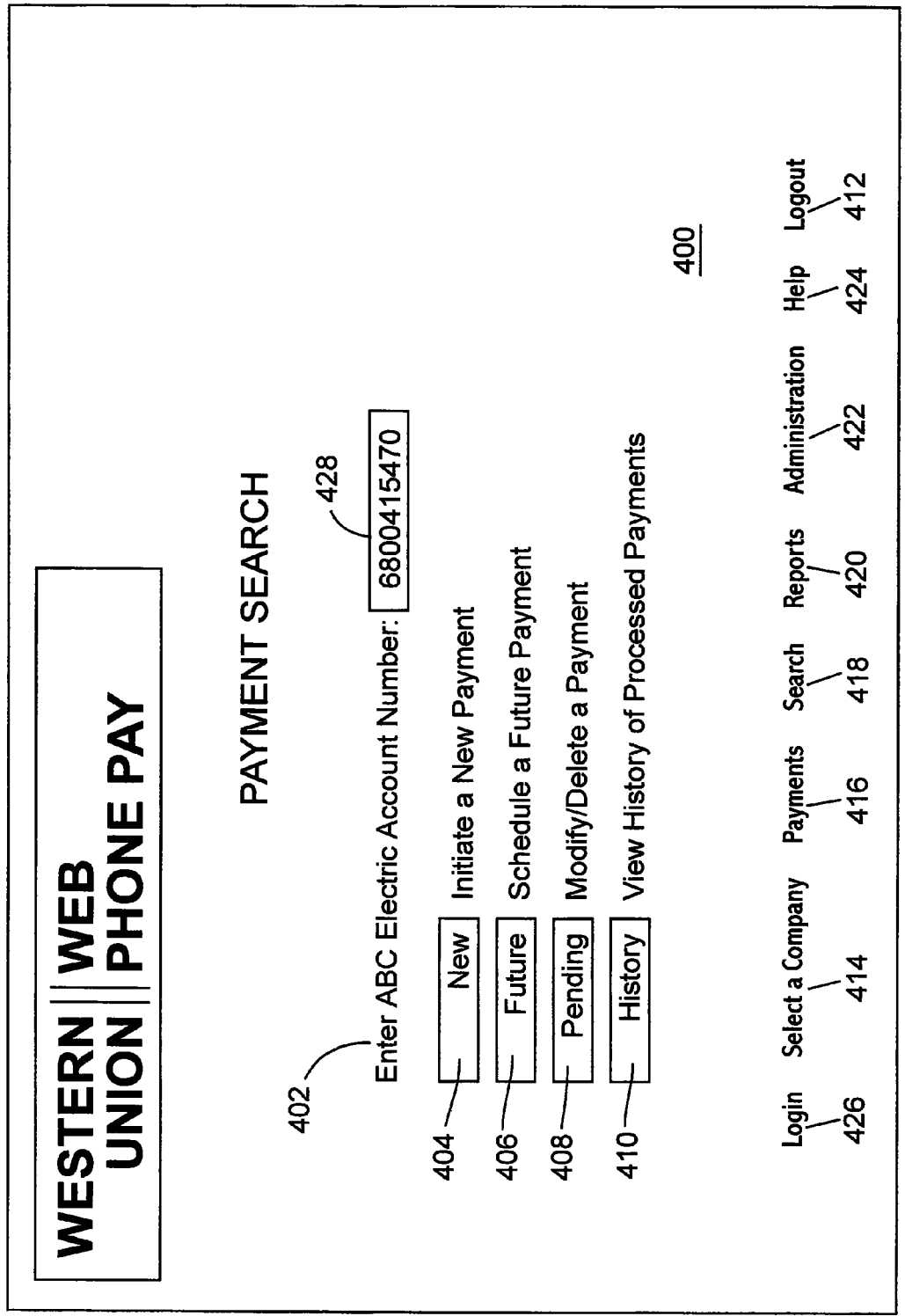
FIG. 4 illustrates a Payment Search display screen according to embodiments of the present invention.
Figure 5:
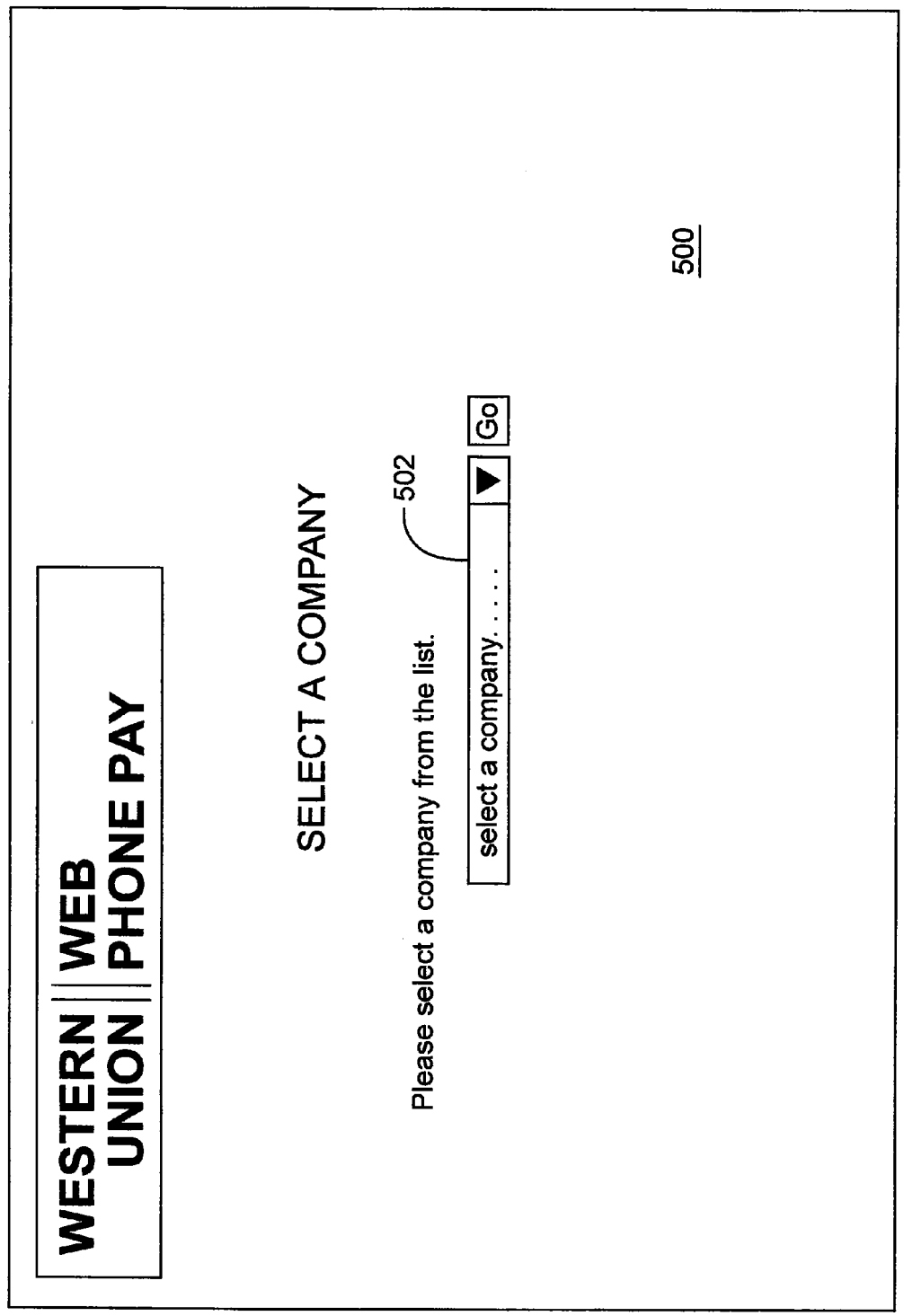
FIG. 5 illustrates a Select a Company display screen according to embodiments of the present invention.

Attention is redirected to the Payment Search display screen 400 of FIG. 4 for a discussion of other selection alternatives. The schedule a Future Payment button 406 causes a Schedule a Future Payment display screen 1200 (FIG. 12) to be displayed. From the Schedule a Future Payment display screen 400, a user may enter future payment information using data fields similar to the data fields of the Initiate a New Payment display screen 800 (FIG. 8). However, the Schedule a Future Payment display screen 1200 includes a date field 1220 for scheduling the data for the future payment to be processed. An Add more Payments button 1214 functions similarly to the Add More Payments button 814 (FIG. 8), causing an Add Additional Future Payments display screen 1300, (FIGS. 13A and 13B) to be displayed. A Future Payment Confirmation display screen 1400 (FIG. 14) and a Future Payment Final Confirmation display screen 1500 (FIG. 15) function similarly to analogous display screens in the Initiate a New Payment process.

Selecting the Pending button 418 of FIG. 4 causes the host computer system 102 to return a Pending Payments display screen 1600 of FIG. 16 for the consumer account identified in the Account Number data filed 428 of the Payment Search display screen 400. The Pending Payments display screen 1600 includes a list of pending transactions 1602 relating to the consumer's account. A transaction may be selected using radio buttons 1604. Once selected, a collector or other user may modify the transaction by selecting a Modify Selected Payment button 1606, or delete the transaction by selecting the Delete Selected Payment button 1608.

Selecting the Delete Selected Payment button 1606 causes the host computer system 102 to return the Delete Payment Confirmation display screen 1700 of FIG. 17. Deletion is confirmed by selecting the Confirm Payment Deletion button 1702. In some embodiments, supervisor approval may be required to delete the transaction. In such embodiments, which may be customized according to the requirements of particular clients, the Supervisor Approval to Delete Payment display screen 1800 may be returned by the host computer system 102 upon selection of the Confirm Payment Deletion button 1702. A supervisor then may enter his supervisor login into a Supervisor Login data field 1802 and select a Continue with Delete Payment button 1804 to approve the deletion. Alternatively, the supervisor may select a Cancel Request button 1806 to abort the transaction deletion. Once a transaction deletion is confirmed, a Delete Payment Final Confirmation display screen 1900 of FIG. 19 is returned by the host computer system 102.

A pending transaction may be modified by selecting the transaction from the list of pending transactions 1602 (FIG. 16) and selecting the Modify Selected Payment button 1606. In response, the host computer system 102 returns the Modify A Pending Payment display screen 2000 of FIG. 20. The display screen 2000 includes a number of editable data fields containing the payment information relating to the selected transaction. A collector or other user may edit the information accordingly and transmit the changes to the host computer system 102 by selecting a Continue button 2002. In some embodiments, information may be masked for security purposes, such as the bank account number in the Bank Account # data field 2004. Further, in still other embodiments certain payment information may not be editable for a pending payment. In this example, the fee 2006 is not editable. Other such examples are possible. The collector may abort the modifications by selecting a Cancel button 2008.

Upon selection of the Continue button 2002, the host computer system 102 returns a Modify a Pending Payment Verification display screen 2100 of FIG. 21. The display screen 2100 includes the modified information for review prior to final confirmation. The information may be confirmed by selecting the Confirm button 2102. The transaction may be modified by selecting a Modify button 2104, which returns the user to the Modify A Pending Payment display screen 2000 of FIG. 20. The modification may be aborted by selecting a Cancel button 2106.

Selection of the History button 410 of FIG. 4 causes the host computer system 102 to return a Payment History display screen 2200 of FIG. 22 for the consumer account identified in the Account Number data filed 428 of the Payment Search display screen 400. The display screen 2200 includes a list of transactions 2202 relating to the consumer. The list may include all transactions ever processed relating to the consumer, or may include only those transactions going back a predetermined period of time. The operator may customize the period of time to suite the needs of particular clients. Further, the information displayed in the list 2002 may be customized for clients by the operator. In some embodiments, the user may obtain more detailed information relating to a transaction by selecting, or "drilling-down" on the transaction. The user may return to the Payment Search display screen 400 by selecting a Return to Main Menu button 2004.

Selecting the Search button 418 causes the host computer system to return a Payment Search display screen 2300 of FIG. 23. Pending and historical payments may be searched using may different criteria. Payments may be searched by entering a consumer's account number in an Account Number field 2302. The search may be limited further by entering a date range into Activity Date fields From 2304 and To 2306. Additionally or alternatively, payments may be searched by entering a specific transaction confirmation number in a Transaction Confirmation Number data field 2308. Selecting a Search button 2308 causes the host computer system 102 to return transactions matching the specified criteria. Selecting a Cancel button 2310 aborts the search.

Selecting the Reports button 420 causes the host computer system 102 to return a Reports display screen 2400. Many different types of reports may be provided, and the types of reports may be customized by the operator to satisfy the needs of particular clients. Each report may include data range fields 2402 to limit the reports to specified periods of time. The fields may default to particular dates, depending upon the particular field. Filtering capability also may be provided by selecting a filter from a drop down menu 2404 to further limit a report to particular transactions. Filters may include, for example, Login ID, Payee, Payment Type, and the like. Selecting a View button causes the corresponding report to be returned by the host computer system 102. In the returned reports, hyperlinks may allow the user to drill-down into more detailed information summarized in the report. A Completed Transactions report may include the total number and dollar value of transactions processed and the number of transactions returned. A Pending/Future-dated Transactions report may include the total number and amount of transactions pending for a particular day or date range. A Deleted transactions report may include the total number and amount of transactions deleted on a particular day or within a date range. A Returned Items report may include the total number and amount of returned transactions for a particular day or date range. Additional filters in for this report may include a reason for return. A Fee Waive for Date Range report may include total consumer fees collected and waived, sorted by collector or user, for a specific data range. A Fee Waive by Reason Waived report may include the total number and dollar amount of consumer fees waived by waive reason. Additional filters for this report may include a reason code. Many other reports are possible.

Figure 25:
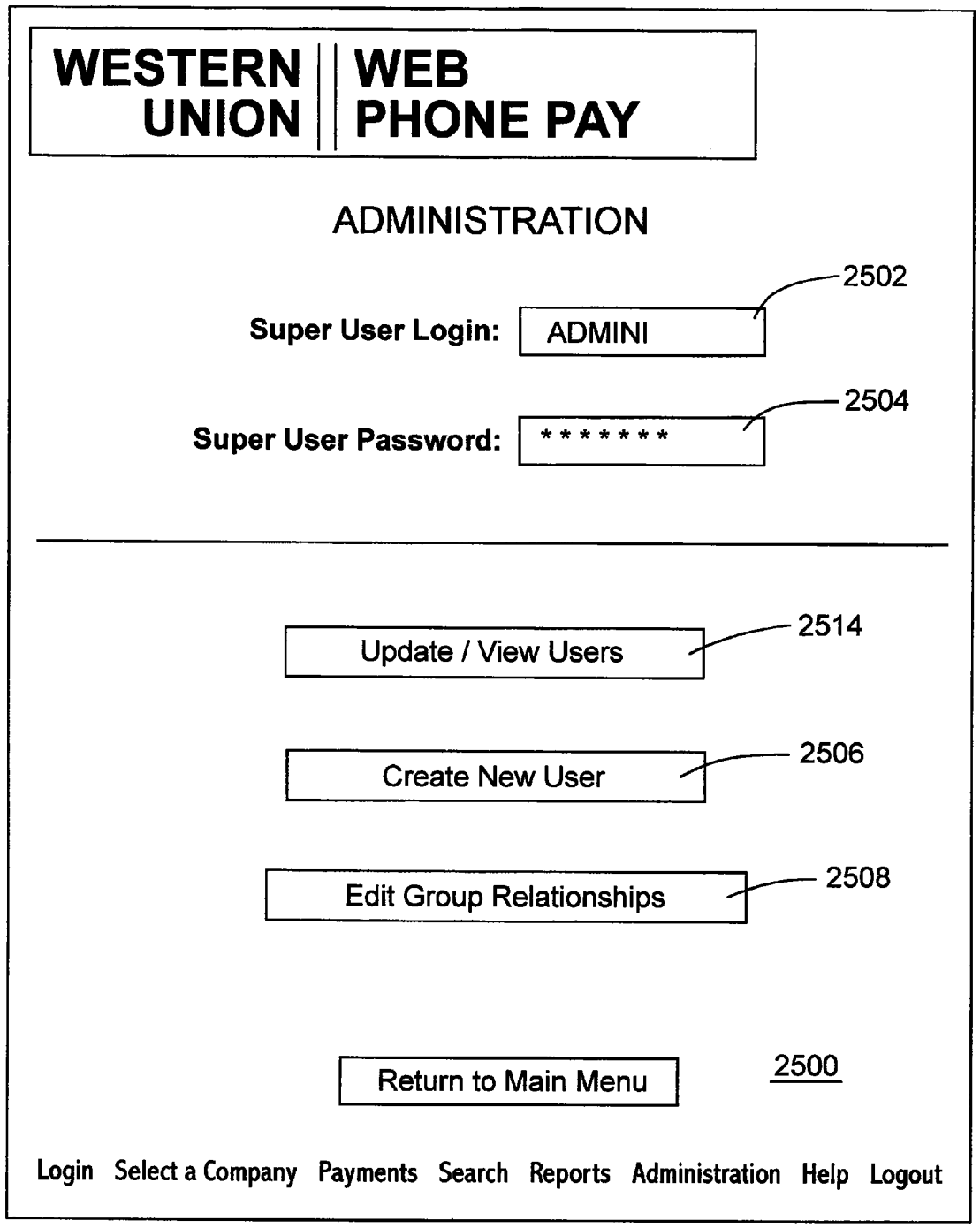
FIG. 25 illustrates an Administration display screen according to embodiments of the present invention.

Selecting the Administration button 422 causes the host computer system 102 to return an Administration display screen 2500 of FIG. 25. The ability to change administrative features may be customized according to the requirement of particular clients. Thus, a Super User Login data field 2502 and Super User Password data field 2504 may be provided for security purposes. Authorized users may accomplish a number of administrative functions, including: updating and viewing user information by selecting a Update/View Users button 2514; create new users by selecting a Create New User button 2506; and edit group relationships by selecting the Edit Group Relationships button 2508. Many other administrative functions are possible.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention may: display information in languages other than English; provide clients the option to specify expiration periods for security and other information; process payments using forms of payments other than credit cards and bank accounts; provide reports of information according to client specifications; filter specified information from reports; and conform to particular state laws relating to the processing of payments and the fees that may be charged for doing so. Accordingly, the above description should not be taken as limiting the scope of the invention, which is defined in the following claims.

What is claimed is:

1. A payment processing system, comprising:
 a host computer system configured to receive payment information via a network from a client computer, wherein the host computer system includes a verification process configured to verify at least a portion of the payment information, wherein the verification is performed contemporaneously with a phone call initiated by a collector to a consumer, wherein the portion of the payment information is verified during the phone call, whereby an attempt by the consumer to provide false payment information is detectable and correctable during the phone call;
 a data storage arrangement configured to store the payment information; and
 a settlement engine configured to:
  receive payment information from the host computer system;
  initiate payment processing by transmitting a file comprising at least a portion of the payment information to a financial institution; and
  transmit a message to a client computing system, the message comprising at least a portion of the payment information.

2. The payment processing system of claim 1, wherein the settlement engine is further configured to receive payment information from the data storage arrangement.

3. The payment processing system of claim 1, wherein the host computer system is further configured to respond to requests for historical payment information by transmitting an electronic file to a user computer, wherein the electronic file comprises payment information.

4. The payment processing system of claim 3, wherein the electronic file comprises payment information from a particular consumer covering a specified period of time.

5. The payment processing system of claim 3, wherein the electronic file comprises payment information to a particular client covering a specified period of time.

6. A payment processing method, comprising:
 receiving at a host computer system payment information from a client computer, wherein the payment information relates to a payment from a consumer;
 verifying at least a portion of the payment information;
 storing at least a portion of the payment information in a database;
 transmitting a first electronic file comprising at least a portion of the payment information to a financial institution, thereby initiating processing of the payment;
 transmitting a second electronic file comprising at least a portion of the payment information to a client computing system; and
 responding to a request for historical information by transmitting to a user computer system a third electronic file comprising at least a portion of the payment information;
 wherein the verifying step is performed contemporaneously with a phone call initiated by a collector to the consumer, wherein the portion of the payment information is verified during the phone call, whereby an attempt by the consumer to provide false payment information is detectable and correctable during the phone call.

7. The payment processing method of claim 6, further comprising initiating an electronic transfer of funds to a client's financial institution representing the payment.

8. The payment processing method of claim 7, further comprising receiving an electronic transfer of funds from a consumer's financial institution representing the payment.

9. The payment processing method of claim 8, wherein the electronic transfer of funds to a client's financial institution is initiated prior to receipt of the electronic transfer of funds from a consumer's financial institution.

10. The payment processing method of claim 7, further comprising receiving an electronic message comprising a rejection of the payment from a consumer's financial institution.

11. The payment processing method of claim 10, further comprising initiating an electronic withdrawal of funds from the client's financial institution.

12. The payment processing method of claim 11, further comprising transmitting to the client computing system a fourth electronic file comprising revised payment information.

13. The payment processing method of claim 6, wherein the third electronic file comprises payment information from a particular consumer covering a specified period of time.

14. The payment processing method of claim 6, wherein the third electronic file comprises payment information to a particular client covering a specified period of time.

15. The payment processing method of claim 6, wherein the first electronic file comprises additional payment information from a least one additional consumer.

16. The payment processing method of claim 15, wherein the first electronic file further comprises information representing a rejection of an attempt to withdraw funds from a consumer's financial institution.

17. The payment processing method of claim 6, wherein the payment information comprises a checking account of the consumer from which the payment is to be made.

18. The payment processing method of claim 6, wherein the payment information comprises a credit card account of the consumer from which the payment is to be made.

19. The payment processing method of claim 6, wherein the payment information comprises a debit card account of the consumer from which the payment is to be made.

20. The payment processing method of claim 6, wherein verifying at least a portion of the payment information comprises contacting the client's computer system to obtain information relating to the payment information.

21. The payment processing method of claim 6, wherein verifying at least a portion of the payment information comprises consulting an electronic file provided by a client to obtain information relating to the payment information.

22. The payment processing method of claim 6, wherein verifying at least a portion of the payment information comprises using an algorithm specified by a client to evaluate at least a portion of the payment information.

23. The payment processing method of claim 22, wherein using an algorithm specified by a client to evaluate at least a portion of the payment information includes checking the arrangement of numbers in an account number of the payment information.

24. The payment processing method of claim 6, wherein verifying at least a portion of the payment information comprises consulting a third party service to verify a routing number of the payment information.

\* \* \* \* \*